Dec. 3, 1929.  P. B. COLE  1,738,096
BARREL TRUCK
Filed Dec. 20, 1927    2 Sheets-Sheet 1
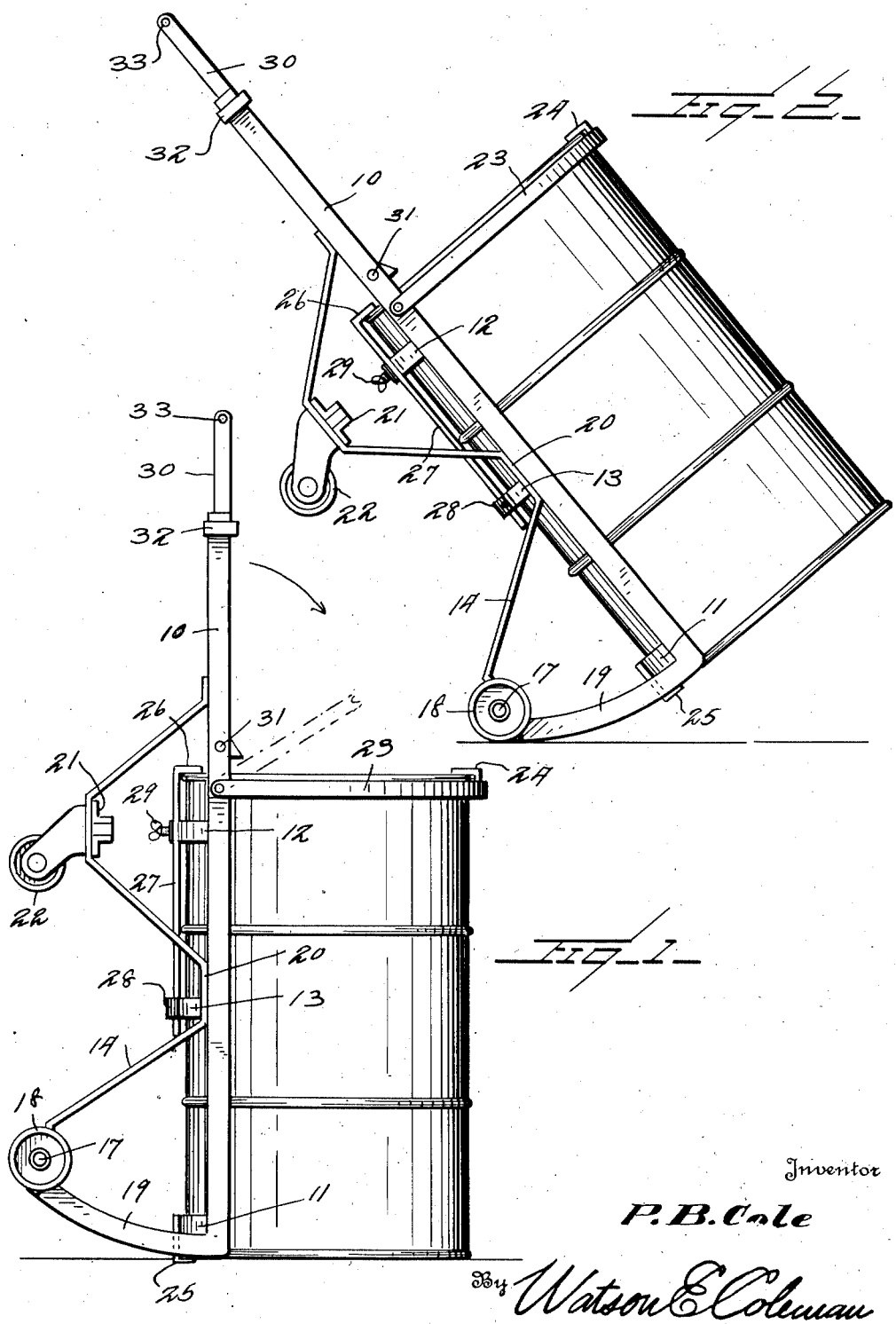
Inventor
*P. B. Cole*
By *Watson E. Coleman*
Attorney Dec. 3, 1929.  P. B. COLE  1,738,096
BARREL TRUCK
Filed Dec. 20, 1927   2 Sheets-Sheet 2
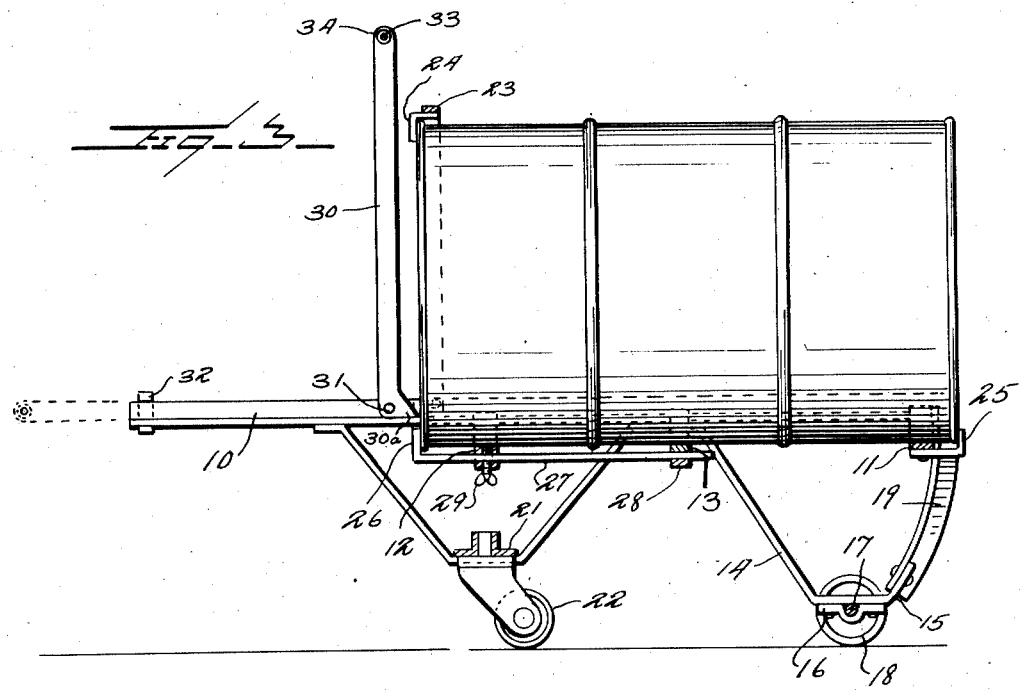
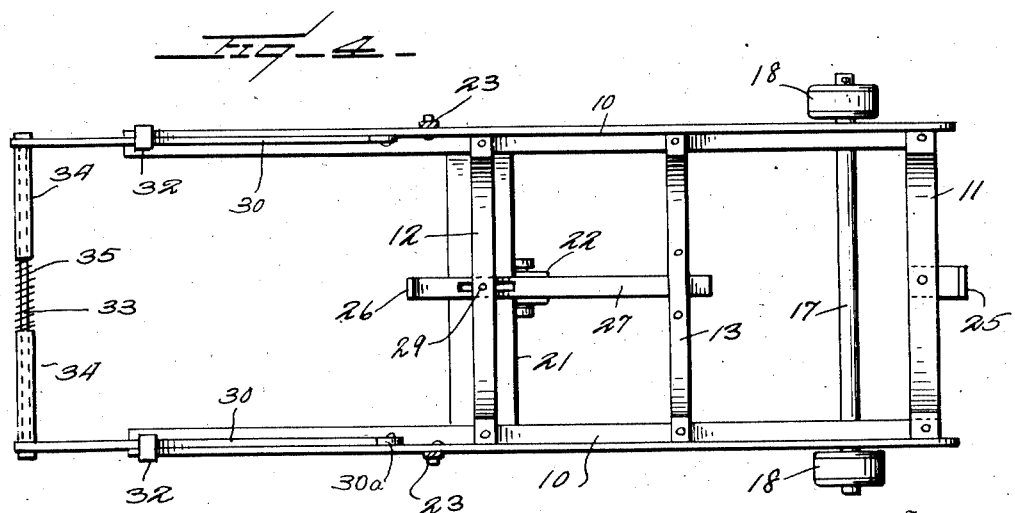
Inventor
P. B. Cole
By Watson E. Coleman
Attorney Patented Dec. 3, 1929

1,738,096

UNITED STATES PATENT OFFICE

PERINO B. COLE, OF CAMBRIDGE, NEBRASKA

BARREL TRUCK

Application filed December 20, 1927. Serial No. 241,404.

This invention relates to trucks for handling barrels, bales or like containers, and the general object of the invention is to provide a barrel carrier or truck so constructed that a barrel may be readily engaged with the truck for transportation or released therefrom for discharge.

A further object is to provide a truck of this kind provided at its ends with rockers whereby the truck may be very readily tilted back from an upright position to an inclined position on its front wheels.

A still further object is to provide a truck which may be lowered into a horizontal position and which in this position is wheel supported and may be readily shifted.

Other objects have to do with the details of construction and arrangement of parts as will appear more fully hereinafter.

My invention is illustrated in the accompanying drawings, wherein:—

Figure 1 is a side elevation of a barrel truck with a barrel thereon, the truck being shown in a vertical position with the barrel engaged therewith;

Figure 2 is a like view to Figure 1 but showing the truck tilted;

Figure 3 is a longitudinal sectional view showing the truck in a horizontal position;

Figure 4 is a top plan view of the truck;

Referring to these drawings, and particularly to Figure 4, 10 designates two longitudinally extending angle irons, these angle irons being connected at their forward ends by means of an arcuate depressed band 11, at their rear ends by an arcuate depressed band 12, and between the bands 11 and 12 by an arcuate depressed band 13. These bands may be made of light metal and are riveted or otherwise attached to the flanges of the angle irons.

Riveted or otherwise attached to the angle irons are the wheel supporting irons 14. These irons are attached at their middles to the angle irons 10 and then extend downward and forward and then slightly upward, as at 15. These portions of the irons 14 are provided with the bearings 16 for the axle 17 carrying wheels 18. The upwardly extending portions 15 are connected by upwardly and outwardly curved rockers 19, these rockers being formed by bending the longitudinal angle irons 10 approximately at right angles and curving these right angular extremities, as shown more clearly in Figure 2. The irons 14, as before stated, are attached to the irons 10 at their middles, as at 20, and the irons then extend downward, rearward and upward, and attached to these irons are the transverse angle irons 21 which support the single caster wheel 22.

Pivotally connected to the outwardly projecting flanges of the angle irons 10 is a barrel-engaging hoop 23. This carries at its middle the rearwardly directed angular hook 24. This hoop 23 may be turned from the dotted line position shown in Figure 1 to the full line position shown in Figure 1 so as to extend down over the chine of the barrel.

Attached to the transversely curved band or rest 11 is a forwardly directed angular hook 25 adapted to engage beneath the lower end of the barrel, as shown in Figure 3, and engaging over the chine of the barrel opposite the hook 24 is an angular hook 26 having an elongated shank 27 passing through a loop 28 carried on the band 13. The transversely curved band or rest 12 slidingly engages the shank 27 and a set bolt 29 passes through this band and through a slot in shank 27 to hold the shank 27 and hook 26 in any adjusted position.

Pivoted to the angle irons 10 rearward of the locking hoop 23 are two handle sections 30. These sections are pivoted at 31 and fit closely inside the outwardly projecting flanges of the angle irons 10. When these sections 30 are folded into parallel relation to the angle irons 10, they project beyond the angle irons 10 and are engaged by hooks 32 which normally hold these members 30 parallel to the angle irons 10 so as to constitute extensions thereof. The members 30 are connected by a transverse rod 33 which passes loosely through the ends of the bars 30 so that these bars may be moved inward. The bars carry the sleeves 34 which surround the rod 33 and at their ends the bars bear against the compression spring 35 which urges these bars outward.

It will be noted that the bars 30 are formed at their lower ends with angularly directed feet 30ᵃ. When the bars 30 are forced inward against the action of the spring 33, they will escape the hooks 32 and the bars may then be turned up to the position shown in Figure 3 with the feet bearing against the frame 10. The handle bars which are formed by the sleeves 34 may then be pushed to push the truck upon its three wheels.

In the use of this device if it be desired to load a barrel onto the truck, the truck is pushed up to the position shown in Figure 1 and the truck is tilted so that the hook 26 rests over the top of the barrel. Then the hoop 23 is dropped over the top of the barrel. Then by pushing forward on the handles in the direction of the arrow in Figure 1, the barrel is tilted on its outer corner, the inner corner being thus raised and when in this position, the lower portion of the truck may be forced forward to carry the hook 25 beneath the lower end of the barrel.

It will be noted from Figure 2 that as the truck is swung from the position shown in Figure 1 to that shown in Figure 2, the truck rocks upon its rockers 19 until the load comes upon the two front wheels. The barrel at this point is in a position for the operator to handle it very easily and convey it to any desired position. When the barrel is unloaded, the truck is turned to the same position as shown in Figure 1 from such a position as that shown in Figure 2. Pushing forward on the handles 34 under these circumstances causes the hook 26 again to fulcrum upon the barrel and the carrier may be then swung forward relative to the barrel, swinging the hook 25 from beneath the barrel, and then by raising the hoop 23 the truck is freed from the barrel. The provision of the long shank 27 upon the hook 26 and the provision of the slot in the shank permits the hook 26 to be adjusted to different heights of barrel.

I have illustrated this device as used in connection with a metallic oil barrel but do not wish to be limited to this, as it is obvious that it might be used with other barrels or a modified form of truck be particularly adapted to carrying and handling other containers. Also it is obvious that slight changes might be made in the details of construction and arrangement of parts without departing from the spirit of the invention as defined in the appended claims.

I claim:—

1. A truck including a wheeled frame consisting of longitudinal members constituting handle bars, transversely extending depressed members connecting the longitudinal members and constituting barrel rests, wheels mounted upon said frame adjacent the forward and rear ends thereof, the longitudinal members being extended rearward and having inwardly projecting hooks, auxiliary handle bars pivoted to said longitudinal members on their inner faces, the bars being adapted to be shifted toward or from each other and to be engaged beneath the hooks on the longitudinal members or turned to a vertical position to permit the truck to be shifted forward upon its wheels without lifting the rear end of the truck, a spring urging said bars apart, and supporting means upon the truck for engaging a barrel, one of said supporting means being shiftable out of engagement with the barrel.

2. A truck including a wheeled frame consisting of longitudinal members constituting handle bars, transversely extending depressed members connecting the same and constituting barrel rests, wheels mounted upon said frame adjacent the forward and rear ends of the frame, the longitudinal members being extended rearward, auxiliary handle bars pivoted to said longitudinal members on their inner faces, there being releasable means for holding the bars parallel to said longitudinal members, the bars at their lower ends being provided with feet preventing the bars from being swung forward and upward and beyond a position where the bars are vertical, whereby said handle bars may be used for moving the truck forward with the truck resting upon all of its wheels.

In testimony whereof I hereunto affix my signature.

PERINO B. COLE.